Figure 2:
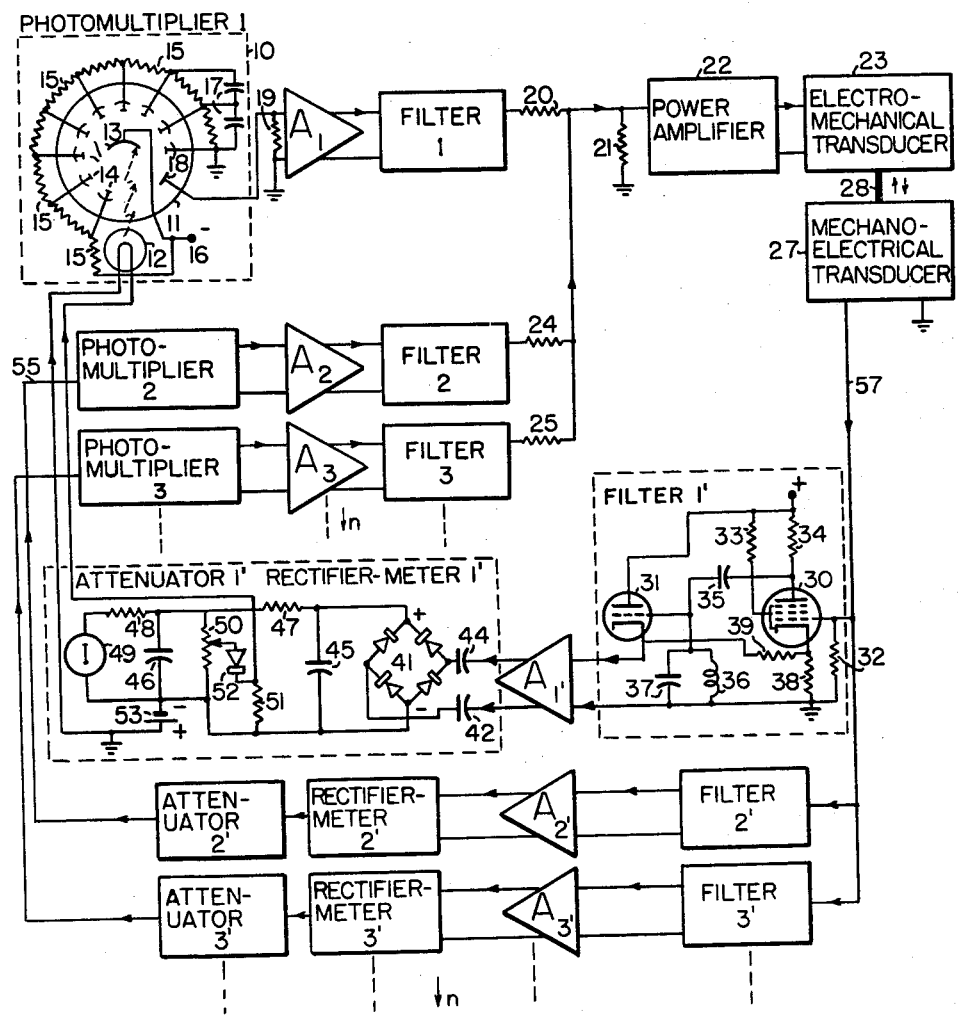

Dec. 29, 1964     C. THEODORE ETAL     3,163,830
METHOD OF GENERATING A VARIABLE AMPLITUDE NOISE SPECTRUM
Original Filed June 10, 1961            2 Sheets-Sheet 1

INVENTORS
CHARLES THEODORE
JAMES A. ROSS
BY
Harry R. Lubcke
AGENT

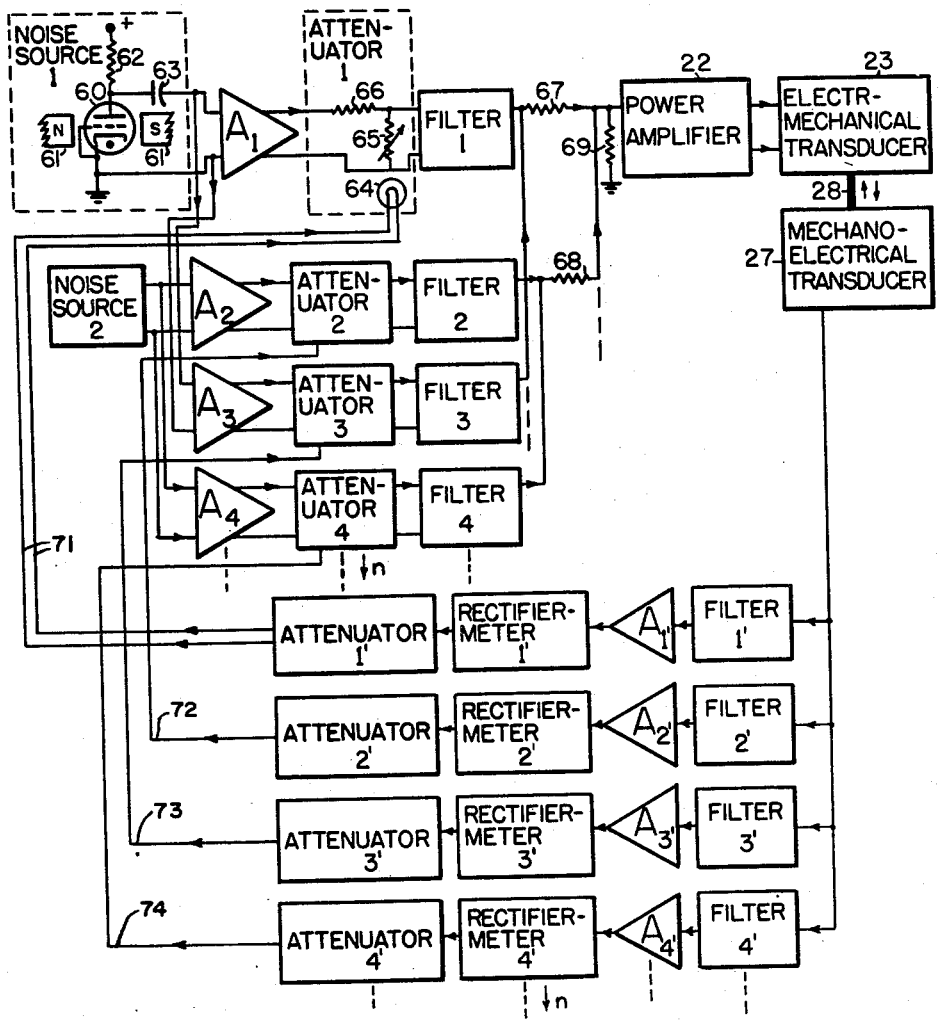
FIG. 3.
FIG. 4.
INVENTORS
CHARLES THEODORE
JAMES A. ROSS
BY
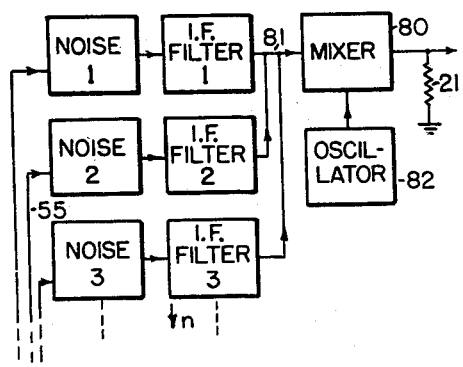
AGENT 3,163,830
METHOD OF GENERATING A VARIABLE AMPLITUDE NOISE SPECTRUM
Charles Theodore, Los Angeles, and James A. Ross, Orange, Calif., assignors to Ling-Temco-Vought, Inc., a corporation of Delaware
Original application Jan. 10, 1961, Ser. No. 81,731. Divided and this application Oct. 6, 1961, Ser. No. 149,801
6 Claims. (Cl. 331—78)

Our invention relates to electrical systems and particularly to such systems as include electromechanical elements operated in a random manner.

This application is a division of my co-pending application entitled, "Random Noise System," filed January 10, 1961, Serial No. 81,731.

In present technology numerous processes are carried out by employing a "noise" type of exciting signal. The efficacy of such operations are often related to the degree of complete randomness of the noise signal; the employment of "pure Gaussian noise."

Important among these processes is that of vibration testing under controlled conditions, as is accomplished with the known electromechanical transducer, or "shaker," in combination with an electrical energizing system. Random noise constitutes an important type of test signal in this art and the capability to retain such a signal completely random with a specified amplitude vs. frequency characteristic regardless of shaker and fixture resonances and regardless of all other spurious influences is an important one. Resonances and spurious effects can be prevented from influencing the performance of the system if adjustable filter means are provided that eliminate peaks and valleys in the amplitude vs. frequency characteristic of the system by providing inverse portions of this characteristic.

Further, many specific types of vibration can be synthesized from a random noise source by employing an adjustable filter complex to give the system an amplitude vs. frequency characteristic that characterizes the specific type of vibration; for instance the type of vibration encountered in shipment by railway freight or by truck.

We have formed these systems and have employed them for both the purely random and the synthesized types of vibration testing. As might be expected, we employed one random noise source. We did not then see any reason for more than one such source. The spurious resonances were removed and/or the specific types of vibration were synthesized by using many parallel filters, perhaps twenty to one hundred. Each of these was adjustable in attenuation and each pass a specific band of the whole frequency spectrum of interest, so that in the whole the complete frequency band was passed.

It will be understood that the filters were formed to pass frequency bands adjacent one to the other, so that all frequencies could be passed and so that by adjustment of attenuation associated with any filter the amplitude characteristic of the whole passed band could be given any desired characteristic. It will also be understood that no practical filters exist with infinitely sharp cut-off frequencies. All have sloping "skirts," and so adjacent filters had common frequencies in the joint passed band.

We found, unfortunately, in this initial apparatus, that the inescapable phase shift of any signal occupying the common frequencies caused the contribution to the signal from one filter to be phased with respect to that of the adjacent filter so that either a cancellation or a reinforcement of the signal amplitude resulted at that frequency. While this might have been compensated-for with non-adjustable filters, the essential requirement of the system called for full adjustability of all filters. We were thus introducing sharp cuts or peaks because of the cancellation or reinforcement phenomena by the very means that were required to eliminate these effects from the system caused by other elements of it.

We then discovered that the peaks and valleys were caused by coherence of the "random" noise as it passed through adjacent filters at common frequencies. Because there was only one noise source the signal energy components at any instant of time were derived from a single electrical energy variation. Accordingly, at the frequencies common to both of each adjacent filters, component energy was present from both filters. Because of the inescapable phase change, or phase distortion, occurring at the skirts of all known electrical filters, the resulting combined amplitude was either greater or smaller than normal, depending upon the particular phase characteristics involved.

We were able to completely remove this serious limitation by providing different sources of noise for adjacent filters. The noise signal components present in one filter were then statistically different from the components present in the adjacent filter at any given instant of time. In fact, the desired complete randomness of the noise signals perfects this situation.

We have embodied this novel method in two general arrangements of apparatus. In one we employ a separate noise source for each filter channel. In the other we employ at least two noise sources and connect these alternately to filters having adjacent pass bands. In either arrangement it is seen that we accomplish the required filter-to-filter randomness.

In addition to manual attenuation control means for setting the overall desired characteristic we have provided novel feedback means for establishing servo control, i.e., automatic gain control, by which the contribution of each filter channel is maintained at a selected amplitude. For this reason, whether we employ a separate noise source for each filter channel, or the minimum of two noise sources, the result as to simplicity of apparatus and economy in manufacture allows a choice, rather than dictating the apparent simplicity of two noise sources.

For the automatic gain control a feedback servo element is required for each filter channel. With a preferred type of noise source according to our invention, the servo element is a simple component of that noise source and so overall simplicity is obtained. Specifically, a photomultiplier photoelectirc cell is employed as the random noise source and a simple incandescent lamp, terminating the feedback loop, determines the noise signal level output from the photomultiplier. For the two noise source embodiment we prefer to employ a photoelectrically sensitive resistor as a gain control in association with an incandescent lamp as the terminating element of the feedback loop. Alternate arrangements are also possible, as will be later detailed.

An object of our invention is to provide a random noise actuated electrical system.

Another object is to provide an adjustable random noise electromechanical system.

Another object is to provide an electrically controlled vibration system having a selectable amplitude vs. frequency characteristic.

Another object is to provide an electromechanical system having a selectable amplitude vs. frequency characteristic devoid of spurious responses engendered by the selection of said characteristic.

Another object is to provide a multiple channel electromechanical system having simple automatic gain controlled random noise sources.

Another object is to provide a multiple channel electromechanical system having only two noise sources to provide completely random operation.

Another object is to provide a multiple channel electromechanical system having hetrodyne means for accomplishing frequency band filtration in combination with plural noise sources.

Other objects will become apparent upon reading the following detailed specification and upon examining the accompanying drawings, in which are set forth by way of illustration and example certain embodiments of our invention.

Figure 1:
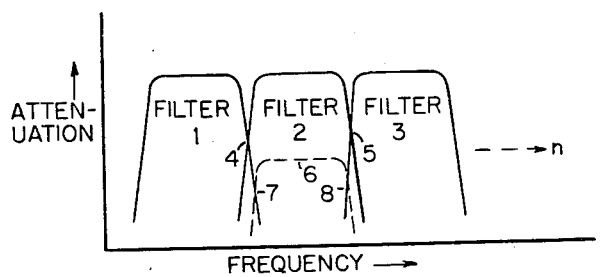

FIG. 1 shows the attenuation vs. frequency characteristics of a plurality of filters required for our system, FIG. 2 shows an embodiment of our system which employs a separate source of noise for each channel thereof, FIG. 3 shows another embodiment of our system which employs a plurality of sources of noise signal typically much fewer than the number of channels in the system, and FIG. 4 shows still another embodiment of our system in which filtration is at frequencies higher than the frequencies utilized.

In FIG. 1 is shown the family of filter characteristics required to obtain a wide band electrical system in which the amplitude vs. frequency characteristic of the whole system may be altered as desired. The individual frequency characteristics are preferably of the band pass type, as identified by "filter 1," "filter 2," "filter 3," and this continues with increasing frequency to "filter $n$," where "$n$" is the number of frequency bands which may be individually adjusted.

The characteristics drawn in solid lines represent the attenuation of each filter for a uniform overall characteristic of attenuation as a function of frequency; the known "flat characteristic." On the other hand, the solid line characteristics for filters 1 and 3 combined with the dotted line characteristic for filter 2 represent an electrical characteristic with reduced attenuation over the passed band of filter 2. This may compensate for the lack of response of an electromechanical transducer over this frequency band; such a transducer being a loudspeaker, a "shaker" unit for vibration testing, or the like. It is desirable that the attenuation of any of the filters be smoothly variable over an amplitude range of many decibels so that any and all idiosyncrasies of the system can be compensated for.

As has been previously brought out, the frequencies common to adjacent filters change when such adjustments are made. This is easily seen in FIG. 1. It is very well known that the skirts of practically realizable filters cannot be infinitely sharp; that is, represented by vertical lines in FIG. 1. A typical practical relation is illustrated in that figure. It will be noted that when the attenuation in the circuit channel of filter 2 is the same as for the other filters (the solid lines) the cross-over frequencies are at 4 and at 5 for the adjacent filters on the low and the high frequency sides of filter 2. However, when the attenuation of filter 2 is reduced, so as to be represented by the dotted curve 6, these cross-over frequencies have changed; being now at points 7 and 8. These frequencies turn out otherwise to be closer together, but the fact that there is a change is the significant effect.

It is for this reason that a shift in the phase on the skirts of the frequency-adjacent filters produces such marked amplitude irregularities when the random signal feeding each of the filters is the same and remains related for all periods of time.

On the other hand, when frequency-adjacent filters are fed from different sources of random electrical variations, it is seen that the effects of phase distortion at the skirts has no effect. If the two sources feeding adjacent filters provide completely random signals the probability is that there will not be frequency components passing through adjacent frequency filters at common frequencies. Accordingly, there is no algebraic addition of amplitudes and no distortion of the amplitude characteristic because of phase distortion at the skirts.

In FIG. 2 complete randomness is attained by employing a separate electrical noise source for each filter channel. While it might be considered that this was an expensive way of achieving the objective, it is seen that this is not so when it is understood that each source is relatively inexpensive and that each includes a simple and effective means to accomplish automatic gain control for each filter channel.

Such a noise source is shown generally at 10 in FIG. 2. It is comprised of a light-tight enclosure, such as indicated at 10, the photomultiplier proper 11, the illuminating lamp 12 and other elements auxiliary to the photomultiplier.

Since the purpose of the photomultiplier is to act as a noise source and not to amplify a specific light signal in the conventional manner, the relatively poor devices of this class may be employed. A high signal to noise ratio is not important because only the "noise" is allowed to be produced. The extremely low noise level often sought in the absence of illumination in other applications is also not essential, since the level of residual noise signal present is in all cases sufficiently low to provide the desired dynamic range of noise signal as we use the device.

The emission of electrons by a photoelectric surface in response to incident photons is a random phenomenon and is the basic function controlled by the relatively constant (but servo adjustable) level of illumination by lamp 12. Residual effects include spontaneous electron emission from the photo cathode, electron emission caused by ion bombardment of the cathode by ionized residual gas, and electrostatic field emission from sharp edges because of the high voltage gradient existing there. However, all of these effects are also random and so the preferred random noise signal is obtained.

In operation, the light from lamp 12 impinges upon photo cathode 13 by close juxtaposition as is usual between such elements. The illumination from the lamp is constant unless a gain adjustment of the whole feedback loop is being made. Consequently, no alternating signal of light flux is impressed upon the cathode and so only random noise is produced. The amplitude of this noise is essentially a linear function of the amount of light falling upon the cathode.

In the known fashion, the few electrons emitted by cathode 13 are multiplied in the electron multiplier comprised of dynodes 14, of which nine are shown in FIG. 2. The dynodes are connected by a series of resistors generally indicated at 15 and extending from a negative potential source indicated at 16, to ground. Capacitors 17 are conventional for enhancing electrical stability. The electrical noise output signal appears at anode 18, greatly amplified with respect to the initial level at the photo cathode. The anode circuit is completed through resistor 19, which has a typical value of one megohm or less. This signal passes to amplifier $A_1$, the output level of which is a few volts.

It has been mentioned that our system may have from 20 to 100 filter channels covering a frequency range of a few thousand cycles in a continuous spectrum in typical embodiments. In FIG. 2 filter 1 is the lowest frequency filter of the group. It may have a central frequency of the order of twenty cycles and a passed band of the order of this amount. It will be understood that the matters of frequency range, width of filter band pass and type of filter are subject to wide variations within the purview of our invention.

In FIG. 2 resistor 20 is connected to the signal output terminal of filter 1 as the element connecting that filter to a resistive matrix for combining all increments of the whole frequency spectrum for driving the electromechanical transducer. In certain parts of the figures the elements are connected by only one line. In the case of these block representations a ground return path is to be understood. The output impedance of filter 1 is of the order of thousands of ohms and resistor 20 has approximately the same value. Shunt resistor 21 essentially matches the combined impedance of all of the resistive outputs from the several filters and so has a typical value of less than one hundred ohms.

According to the usual and necessary practice of audio sound or of vibration testing a power amplifier 22 is connected to the output of the resistive matrix in order to suitably drive the electromechanical transducer 23. This amplifier may have a power capability of from a fraction of a watt to the order of megawatts, depending upon the practical application.

Electromechanical transducer 23 is typically an electromagnetically driven device, such as a cone type loudspeaker or any of the electromagnetically driven vibratory "shakers" employed in the vibration testing art, as well as sonar devices of this class. Other types of useful loads may also be employed. Our invention is primarily concerned with operating electrical systems in a truly random manner according to a controllable characteristic and the particular instrumentalities employed may vary over a wide range.

In a manner analogous to the channel already described, a second channel including photomultiplier 2, amplifier $A_2$, filter 2 and matrix resistor 24 is provided to contribute a second passed band of electrical noise energy adjacent to the passed band of the first filter channel. These two passed bands have frequencies in common, as shown in FIG. 1, and has been previously described, but the noise signals are completely random because a completely separate noise source is employed for each channel. Typically, the second channel may have a central frequency of the order of forty cycles and the filter may be of the same type as filter 1.

Still further, a third channel, including photomultiplier 3, amplifier $A_3$, filter 3, and matrix resistor 25 provides a channel adjacent to channel 2. The central frequency of channel 3 may be fifty-five cycles.

The dotted vertical lines under the major components of these channels and the letter "$n$" indicates a continuation of this adjacent channel structure to "$n$" channels, which in the sum embrace the whole frequency spectrum of interest. As has been inferred, "$n$" may have a relatively high value, such as from 20 to 100.

For all of the direct channel filters 1, 2, 3, . . . $n$, we have employed a passive type filter comprised of a series of several "pi" sections of the "M" derived type in order to obtain individual filters having relatively steep skirts and adjacent bands of frequencies. Filter 1, of course, need be only a low pass filter.

We now turn to the feedback part of the embodiment of FIG. 2.

Mechanoelectrical transducer 27 is mechanically connected to electromechanical transducer 23 by a connection 28. Transducer 27 may be an accelerometer, a rigid transducer constituted to transmit force, or other type of motion to electrical response device. It may be mounted directly upon the table of transducer 23, etc., as will be understood.

The electrical output of transducer 27 is amplified as necessary to drive the lamp load of each channel, as lamp 12, but an illustration of such an amplifier in detail has not been shown. In fact, certain of the filters of the feedback channels contain amplifying vacuum tubes, as is brought out below.

Considering channel 1', filter 1' contains active elements 30 and 31; vacuum tubes or the equivalent. As shown, vacuum tube 30 is a pentode, the control grid of which is connected to the electrical output terminal of mechanoelectrical transducer 27. Grid return resistor 32, screen dropping resistor 33 and anode resistor 34 have the usual values appropriate to the vacuum tube employed. A coupling capacitor 35 connects the plate (or anode) of tube 30 to the grid of triode 31. Connected from this grid to ground is the parallel resonant circuit composed in inductor 36 and capacitor 37. This is the frequency-discriminative element of this filter and we have found this configuration desirable for the low frequency filter units.

A common cathode connection is employed between tubes 30 and 31, in which resistor 38 is common to both cathodes and has a resistance value of less than one thousand ohms and resistor 39 connects between the cathodes but carries only the cathode current of tube 31. Resistor 39 has a typical resistance value of several thousand ohms. Ths circuit arrangement gives positive feedback to increase the resonant Q of the tuned circuit 36–37.

The electrical noise energy within the narrow frequency band passed by filter 1' passes from the cathode of vacuum tube 31 to amplifier $A_{1'}$, which amplifier raises the signal level to several volts for subsequent rectification by bridge rectifier 41 in the rectifier-meter entity 1'. The input to the rectifier is conveyed from the amplifier to opposite sides of the bridge by two capacitors 42, 44, each having a capacitance of the order of a tenth microfarad.

Capacitors 45 and 46 are connected to the output of the rectifier and constitute the capacitance part of a low pass filter. The capacitance values of these capacitors are in the multi-microfarad range in order to accomplish reasonably complete filtering and most importantly to provide a necessary integrating effect. The latter effect is required to provide a reliable reading of an indicating meter to be described. Because of the random nature of the noise signal, the energy of the frequency band components very from instant to instant for the relatively narrow bands which we analyze. Only a reading representing the integration of the noise signal over a period of several seconds duration can be relied upon as being the measure of the long time level in the given frequency band.

Resistor 47 connects between one terminal of each of capacitors 45 and 46 and forms part of the resistive portion of the low pass filter. It has a resistance of a few thousand ohms. Resistor 48 connects to resistor 47 but is only in circuit with meter 49. Resistor 48 has a resistance value twice that of resistor 47. Meter 49 is a milliameter. It reads the noise signal level in the particular filter band pass for the output from electromechanical transducer 23 as determined by mechanoelectrical transducer 27, irrespective of the setting of the feedback attenuation next to be described.

The attenuator per se is potentiometer 50, which has a total resistance of the order of 500 ohms. This is connected to lamp 12 in photomultiplier 1 to complete the feedback loop. Certain auxiliary elements are also included. Lamp 12 is primarily powered by battery 53, the circuit thereto being completed through resistor 51, which has a resistance of one hundred ohms in a typical embodiment. The voltage of battery 53 is of the order of 20 volts and in practice is an A.C. to D.C. filtered power supply.

The adjustable arm of potentiometer 50 is connected to the lamp side of resistor 51 through Zener diode 52. The latter has a constant voltage (breakdown) of several volts and acts to provide a "delayed A.V.C." to the feedback path. The rectifier output, arising in potentiometer 50 is poled to reduce the effective voltage on lamp 12; i.e., with no rectifier output the lamp glows brightly, while with large rectifier output it glows dimly. Until the voltage breakdown on the Zener diode is exceeded no output of the rectifier is applied to reduce the brilliancy of the lamp, thus providing the delayed type of automatic volume control (A.V.C.).

A differential amplifier may be connected between the top of resistor 51 and the top (negative) terminal of battery 53. This is employed to increase the sensitivity of the lamp circuit in such embodiments as this may be desired.

It is to be understood that although the long time constant filtering of filters 45, 46, 47, etc. is necesssary and desirable with the normally employed narrow band filters for spectrum analyzing, other types of operation may be employed. If the filters are broad band, or it is desired to measure transient values of energy, the low pass filter is eliminated. Also, lamp 12 then becomes a gaseous discharge lamp and means are provided to pulse the lamp, such as a Schmitt trigger circuit. With this type of operation the repetition frequency of the pulses determines the average illumination and so the feedback control effect.

In an analogous manner the next adjacent higher frequency increment is filtered from the whole response of mechanoelectric transducer 27 by filter 2', is amplified by amplifier A₂', rectified, filtered, meter-indicated and attenuated by the other 2' entities and delivered via wire 55 as gain control energization to another lamp 12 (not shown) to be found in photomultiplier entity 2.

Similarly, channel 3' gives inverse feedback control for channel 3 and the next higher adjacent frequency increment; and so on to the total of "n" channels and corresponding increments of higher and higher frequency. We have found that for channel 4' and higher, the active filter of the type 1' is not required and that these filters may be of the passive type of direct channel filters 1, 2, 3, etc.

When vacuum tubes are employed in the several filter channels a filament lamp 12 having a voltage rating within the range of 25 to 110 volts is suitable. When transistors are employed instead, the circuits are normally arranged for lower impedance throughout, and the voltage rating of the lamp is in the 4 to 20 volt range.

While the photomultiplier may have a wide range of characteristics and still be suitable for element 11, we prefer the older types, such as the (RCA) type 931, 931A, etc. It will be realized that as long as the operation of these tubes is stable and generally reliable, the otherwise rejects may be employed.

The meters 49 in each of the several channels allow convenient determination of the spectral characteristic of an unknown type of vibration. The unknown vibration is caused to shake electromechanical transducer 23. The electrical output of mechanoelectric transducer 27 is thus a replica thereof. Alternately, if the electrical representation of the unknown noise or vibration is available, this is merely reproduced upon input bus 57 in lieu of an output from element 27 and the above processing repeated. Also, by observing the meters 49 the operator can observe the spectral behavior of the system under any type of operation and may alter the characteristic as desired.

On the other hand, meters 49 are not an integral part of the several feedback loops, and so can be dispensed with.

FIG. 3 shows an alternate embodiment of our invention, in which the randomness of the noise sources is provided by only two such sources and the servo control is accomplished by electrically adjustable attenuators.

Noise source 1 of FIG. 3 may be any having a true random electrical output. We have employed a commercially available gas-filled triode 60 which is connected as a diode by connecting the cathode and the grid together. This has been the 6D4 tube. A magnetic field has been impressed across this tube by a magnet having poles 61 in order that the discharge in the tube shall not be oscillatory. Resistor 62 is connected to the anode of tube 60 and allows the noise output to be built-up as a voltage thereacross. Capacitor 63 is connected between the anode and the output terminal to remove the positive D.C. potential from that output, such potential being supplied by a source indicated by the plus sign but not shown. The other output is from the cathode of the tube and this is connected to ground. Throughout FIG. 3, when two conductive paths are not shown between block elements the conductive path through ground is inferred.

The noise output from source 1 is fed to amplifier A₁, which raises the level to a few volts, as did the same amplifier in FIG. 2.

Since there is not a separate noise source for each filter channel in this embodiment it is necessary to obtain servo (or automatic gain) control by other means. We prefer the electrically adjustable attenuator 1 having a small electric lamp 64 which alters the resistance of a photosensitive resistor 65 and which is connected in shunt to filter 1 channel. Resistor 66 is connected in series in the channel adjacent to resistor 65. Resistor 66 is not photoelectric, but is of the usual fixed type. In a manner of control analogous to that already described for FIG. 2 the brightness of lamp 64 provides constant gain for channel 1 for a given setting of desired attenuation therein despite variation of secondary parameters.

The noise signal in channel 1 then passes to filter 1 and only the relatively narrow band passed by that filter is passed on. Filter 1 in FIG. 3 is the same as filter 1 in FIG. 2, as are other entities similarly identified in the two figures.

The resistive matrix of FIG. 3 differs from that of FIG. 2. It will be understood that while any of the series of frequency-adjacent band pass filters have response at frequencies in common upon the skirt portion of each, the response to electrical energy a whole band-pass-frequency-interval away is negligible. Thus, alternate filters of a frequency-adjacent group of filters can be directly connected to a given matrix resistor and separate such resistors are not required.

In FIG. 3, therefore, the outputs of filters 1 and 3 connect directly to one terminal of resistor 67, while the outputs of filters 2 and 4 connect directly to resistor 68, and so on for the "n" filters employed. The opposite ends of these resistors are connected to shunt resistor 69. The latter has a higher value than resistor 21 in FIG. 2, as two, three, or $n/2$ or $n/3$ times higher, depending upon whether the individual filters are connected in alternate pairs, whether a triple configuration, or an up to $n/2$ or $n/3$ configuration following the same scheme is employed. This arrangement reduces the matrix loss accordingly.

The power amplifier 22, electromechanical transducer 23, mechanoelectrical transducer 27 and the mechanically coactive element 28 between these two entities are the same as in FIG. 2.

Similarly, the feedback paths in FIG. 3 are the same as in FIG. 2; there being a primed path for each of the similarly numbered direct channels in both figures. These entities have been previously detailed and the permissible range of alternates set forth, so no further explanation is required here.

The point of difference between the two figures in this feedback portion of the apparatus lies in the placement of the feedback control lamp (64) in association with an attenuative device rather than as a means (12) to energize a noise source. Lamp 64 and photoresistor 65 may be combined in a small tubular light-tight enclosure and represent a relatively inexpensive means for attenuation control. Also, this mode of control is small and simple as compared to other combinations, such as a reversible motor-operated potentiometer.

The lamp circuit from rectifier-meter 1' to lamp 64 is detailed by reference to FIG. 2 for the former entity and by noting wires 71, etc. in FIG. 3. The circuit of FIG. 3 may be formed of components of somewhat different values and/or characteristics in order to coact with the photoresistor rather than with the photomultiplier, as will be understood by those skilled in the art, but the method of operation is the same; a brighter light caused by greater feedback energy reduces the energy passed by the main filter channel.

The connections from the rectifier-meter entities in FIG. 3 to the lamps thereof as connections 71 for channel 1–1', are 72 for channel 2–2', 73 for channel 3–3', 74 for channel 4–4', etc. to channel $n$–$n'$.

FIG. 4 is illustrative of a further embodiment of our system in which the noise spectrum utilized from the wide band noise sources is at a higher frequency than is finally employed for useful purposes and after filtering into band pass increments the noise is heterodyned down in frequency to the frequency desired. FIG. 4 is fragmentary and is to be taken in connection with FIG. 2 for completion. It will also be later appreciated that the mode of operation and the instrumentalities of FIG. 4 may also be employed in connection with the showing of FIG. 3.

It is known that the noise sources of either of FIGS. 2 or 3 produce random noise well into the radio frequency spectrum. In fact, a low pass filter is sometimes employed with these sources in such embodiments in order that there shall not be spurious radio frequency energy passing as uncontrolled residuals throughout the systems. In FIG. 4, however, use is made of what may be termed "intermediate frequency" noise according to the terminology of the radio receiver art. Should a useful spectrum from a subaudible lower limit to, say, 2,000 cycles as an upper limit be desired, an intermediate frequency spectrum of corresponding width is selected within the range of perhaps 10 to 300 kilocycles. Where the intermediate frequency is chosen depends upon the type of filter elements it is desired to use and upon similar practical aspects.

Let it be assumed that the intermediate frequency band chosen is from 50 to 52 kilocycles. I.F. filter 1 in FIG. 4 then becomes a magnetostriction filter, say, having the narrow frequency band of from 50 to 50.025 kilocycles. I.F. filter 2 is the same, but with a frequency band of from 50.025 to 50.050, and so on. Magnetostriction filters are known to have sharp resonances and so may be employed for such closely adjacent frequency bands. It will also be understood that an intermediate frequency of the order of 10 kilocycles may be used should it be desired that the precision of filtering frequency be only one-fifth as great as for the 50 kilocycle example.

As known, in magnetostriction filtering a magnetostrictive tube, say of nickel, is energized to mechanical vibration by impressing the incoming electrical energy as a varying magnetic field in a coil surrounding the tube and taking off the filtered resultant with another coil.

Alternately, a crystal lattice type of filter may be employed, in which quartz crystals are used. In this type of filter a number of such crystals are connected in a network to form a flat-topped response band-pass filter with a good adjacent frequency attenuation characteristic.

The number of complete channels in FIG. 4 is the same as in FIG. 2 or 3. The several filter outputs are brought together to a mixer 80 at input 81. The mixer is the same as employed in the radio receiver art; a vacuum tube having one electrode of the nature of a grid upon which the incoming signal energy is impressed, as at 81, and another electrode, as another grid or the cathode, upon which heterodyning oscillator electrical energy is impressed. This comes from oscillator 82. As is also known, the difference in frequency between that of the oscillator and the intermediate frequency is chosen so that that difference is the desired useful frequency. For filter channel 3 this is of the order of 100 cycles. It will be understood that a shunt resistor 21 in FIG. 4, the same spectrum of incremental frequency bands having individually determined amplitudes of noise energy as present at resistor 21 in FIG. 2, is present. Accordingly, the remainder of the structure of FIG. 2 is included in FIG. 4 by inference. The individual feedback conductors, such as 55 in FIG. 4 are the same as shown in FIG. 2 and indicate the return of each feedback loop to the initial source for the channel.

In the operation of any of the systems of this type it is to be noted in passing that the aspect of phase cancellation has greater practical significance than phase reinforcement. What this means is that phase distortion at the skirts of frequency-adjacent filters may cause sufficient cancellation by algebraic addition of opposed components to place a deep "cut," or null, in the amplitude vs. frequency characteristic of the random noise spectrum, but that reinforcement can only cause a peak of 3 db, or double power. As has been previously mentioned the actual detail of such algebraic addition is far too fortuitous to be controlled by engineering design and the only answer is to employ separate sources of noise for adjacent frequency bands according to our invention.

It will be understood that certain modifications may be made in the illustrative embodiments described herein.

The photomultiplier light-source type of noise generator of FIG. 2 may be employed in the apparatus of FIG. 3 instead of the gas-tube source. In such a modification the lamp 12 of the light-source generator is maintained at strictly uniform illumination, since this then determines the noise level for many filter channels. Servo control is obtained by lamps, as 64, in the several attenuators of FIG. 3.

The two noise sources shown in FIG. 3 represent the minimum number of such entities in that type of embodiment. A greater number, such as four, six, etc. may be employed, with the various filter channels grouped to be fed from different sources. Our criterion that filter channels having frequencies in common must be fed from separate source must still be observed.

The resistive matrix of FIG. 3 may be employed in FIG. 2 and vice versa.

Other mechano-resonant elements may be employed for the I.F. amplifiers of FIG. 4, such as tourmaline or Rochelle salt.

The order of connection in the series circuits of the filter channels is subject to some alteration. The positions of amplifier $A_1$ and filter 1 may be interchanged in FIG. 2, and so also for the other channel 2, 3, etc. A similar interchange may also be made in FIG. 3 with respect to amplifier $A_1$ and filter 1, etc.

Still other modifications in the characteristics of the circuit elements, details of circuit connections and alteration of the coactive relation between the elements may be taken without departing from the scope of our invention.

Having thus fully described our invention and the manner in which it is to be practiced, we claim:

1. The method of producing vibration according to a noise spectrum with selectable amplitudes for contiguous frequency bands of said spectrum in which said bands have frequencies in common which includes the steps of;
    (a) forming electrical noise signals for each of said frequency bands so that said noise signals are non-coherently random in adjacent said frequency bands at said common frequencies,
    (b) separately adjusting the amplitudes of said noise signals in selected said frequency bands,
    (c) combining the electrical noise signals of each of said frequency bands to form said noise spectrum,
    (d) converting the electrical noise spectrum into mechanical vibrations proportional to said noise spectrum,
    (e) converting said mechanical vibrations to a corresponding electrical signal spectrum,
    (f) separating said signal spectrum into frequency bands corresponding to the first mentioned said frequency bands, and
    (g) individually controlling the amplitudes of said noise signals by a corresponding separated signal of said signal spectrum to thereby maintain the adjusted said amplitudes.

2. The method according to claim 1 in which the individual control of the adjusted amplitudes of paragraph (g) includes the steps of;
    (a') forming an intensity of light for each of said frequency bands from said corresponding electrical signal spectrum proportional to the degree of control required in the production of noise for each of said frequency bands, and (b') altering an electrical characteristic affecting the transmission of the noise signal for each of said frequency bands by said intensity of light.

3. The method according to claim 1 in which the individual control of the adjusted amplitudes of paragraph (g) includes the steps of;
(a') individually rectifying the separated signals of said signal spectrum, and
(b') applying the rectified signal for the amplitude control of said electrical noise signal of each corresponding said frequency band.

4. The method of producing vibration according to a fully random noise spectrum with constant selectable amplitudes for successive contiguous incremental frequency bands of said spectrum in which said bands have frequencies in common which includes the steps of;
(a) separately forming electrical noise signals for each of said incremental frequency bands so that said noise signals are non-coherently random in adjacent said incremental frequency bands,
(b) separately adjusting the amplitudes of said noise signals in selected said incremental frequency bands to provide a desired amplitude vs. frequency characteristic for said spectrum,
(c) combining the electrical noise signals of each of said frequency bands to form said noise spectrum,
(d) converting the electrical noise spectrum into mechancial vibrations proportional to said noise spectrum,
(e) converting said mechanical vibrations to a corresponding proportional electral signal spectrum,
(f) separating said signal spectrum into incremental frequency bands corresponding to the first-mentioned said incremental frequency bands, and
(g) individually controlling the adjusted amplitudes of said noise signals by a corresponding separated signal of said signal spectrum to thereby maintain the adjusted said amplitudes.

5. The method of producing vibration according to a fully random noise spectrum with selectable amplitudes for successive contiguous frequency bands of said spectrum in which said bands have frequencies in common which includes the steps of;
(a) forming two separate random electrical noise signals,
(b) supplying noise signals from alternate noise sources to contiguous frequency bands so that said noise signals are non-coherent at the common frequencies of said contiguous frequency bands,
(c) separately adjusting the amplitudes of said noise signals in selected said contiguous frequency bands,
(d) combining the electrical noise signals of each of said frequency bands to form said noise spectrum,
(e) converting the electrical noise spectrum into mechanical vibrations proportional to said noise spectrum,
(f) converting said mechanical vibrations to a corresponding electrical signal spectrum,
(g) separating said signal spectrum into contiguous frequency bands corresponding to the first-mentioned said contiguous frequency bands, and
(h) individually controlling the adjusted amplitudes of said noise signals by electrical attenuation according to the amplitude of a corresponding separated signal of said signal spectrum to thereby maintain the adjusted said amplitudes.

6. The method of producing vibration according to a noise spectrum with selectable amplitudes for contiguous frequency bands of said spectrum in which said bands have frequencies in common which includes the steps of;
(a) separately forming electrical noise signals for each of said frequency bands which electrical noise signals are higher in frequency than the frequencies embraced within the frequency band for which the noise signals are to be employed,
(b) combining all said electrical noise signals,
(c) heterodyning all of said electrical noise signals to lower frequencies,
(d) converting said lower frequencies into mechanical vibrations proportional to said lower frequencies,
(e) converting said mechanical vibrations to a corresponding electrical signal spectrum,
(f) separating said signal spectrum into frequency bands corresponding to the first-mentioned said frequency bands, and
(g) individually controlling the amplitudes of said noise signals by a corresponding separated signal of said signal spectrum to thereby maintain the adjusted said amplitudes.

References Cited by the Examiner

UNITED STATES PATENTS

| | | | |
|---|---|---|---|
| 2,490,487 | 12/49 | Stevens | 331—78 |
| 2,494,594 | 1/50 | Swank | 331—78 X |
| 2,793,292 | 5/57 | Wolff | 331—183 |

JOHN KOMINSKI, Primary Examiner.

ROY LAKE, Examiner.